US009906429B2

(12) United States Patent
Johnsen et al.

(10) Patent No.: US 9,906,429 B2
(45) Date of Patent: Feb. 27, 2018

(54) PERFORMING PARTIAL SUBNET INITIALIZATION IN A MIDDLEWARE MACHINE ENVIRONMENT

(75) Inventors: Bjorn-Dag Johnsen, Oslo (NO); Line Holen, Fetsund (NO); Roy Arntsen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/235,130

(22) Filed: Sep. 16, 2011

(65) Prior Publication Data

US 2012/0072562 A1 Mar. 22, 2012

Related U.S. Application Data

(60) Provisional application No. 61/384,228, filed on Sep. 17, 2010, provisional application No. 61/484,390, (Continued)

(51) Int. Cl.
*G06F 15/173* (2006.01)
*H04L 12/701* (2013.01)
(Continued)

(52) U.S. Cl.
CPC ............ *H04L 45/00* (2013.01); *H04L 12/462* (2013.01); *H04L 41/0659* (2013.01); *H04L 45/50* (2013.01); *H04L 69/40* (2013.01)

(58) Field of Classification Search
CPC ........... H04L 41/0213; H04L 29/08072; H04L 67/1097; H04L 69/329; H04L 63/08; (Continued)

(56) References Cited

U.S. PATENT DOCUMENTS 5,805,805 A  9/1998 Civanlar et al.
5,964,837 A * 10/1999 Chao ...................... H04L 41/22
                                                    709/224

(Continued)

FOREIGN PATENT DOCUMENTS

CN         156787     1/2005
CN        1728664     2/2006
(Continued)

OTHER PUBLICATIONS

InfiniBands^SM Trade Association, InfiniBand™ Architecture Specification, vol. 1, Release 1.2.1, Nov. 2007, pp. 1-1727.
(Continued)

*Primary Examiner* — Anthony Mejia
*Assistant Examiner* — Schquita Goodwin
(74) *Attorney, Agent, or Firm* — Tucker Ellis LLP

(57) ABSTRACT

A system and method can perform subnet initialization in a middleware machine environment. In accordance with one embodiment, a plurality of management nodes in the middleware machine environment can be interconnected so that a plurality of subnet managers that are associated with the plurality of management nodes can communicate with each other using an in-band communication protocol. The plurality of subnet managers can negotiate and elect a master subnet manager, which operates to configure and manage the middleware machine environment. The master subnet manager can replicate one or more subnet initialization policies to other subnet managers in the middleware machine environment using the in-band communication protocol. The master subnet manager can then set up a plurality of client nodes in the middleware machine environment based on the one or more subnet initialization policies.

25 Claims, 5 Drawing Sheets

Related U.S. Application Data filed on May 10, 2011, provisional application No. 61/493,330, filed on Jun. 3, 2011, provisional application No. 61/493,347, filed on Jun. 3, 2011, provisional application No. 61/498,329, filed on Jun. 17, 2011.

(51) Int. Cl.
  *H04L 12/46* (2006.01)
  *H04L 12/24* (2006.01)
  *H04L 12/723* (2013.01)
  *H04L 29/14* (2006.01)

(58) Field of Classification Search
  CPC ... H04L 12/462; H04L 45/00; H04L 41/0659; H04L 69/40; H04L 45/50; G06F 11/1456; G06F 11/1471; G06F 11/2094; G06F 15/173; G06F 11/1425; G06F 17/30575; G06F 11/1474
  USPC ....... 709/223, 209, 220, 238, 229, 226, 228; 707/204, 638, 610, 613; 711/162; 370/401, 219; 718/1; 714/4.12, 2
  See application file for complete search history.

(56) References Cited

U.S. PATENT DOCUMENTS

| | | | |
|---|---|---|---|
| 6,014,669 A * | 1/2000 | Slaughter | G06F 17/30581 707/610 |
| 6,091,706 A | 7/2000 | Shaffer | |
| 6,202,067 B1 * | 3/2001 | Blood | G06F 11/1474 707/613 |
| 6,463,470 B1 | 10/2002 | Mohaban et al. | |
| 6,594,759 B1 | 7/2003 | Wang | |
| 6,647,419 B1 * | 11/2003 | Mogul | 709/226 |
| 6,678,835 B1 * | 1/2004 | Shah et al. | 714/4.12 |
| 6,748,429 B1 | 6/2004 | Talluri et al. | |
| 6,829,685 B2 | 12/2004 | Neal et al. | |
| 6,904,545 B1 | 6/2005 | Erimli et al. | |
| 6,941,350 B1 | 9/2005 | Frazier et al. | |
| 6,963,932 B2 | 11/2005 | Bhat | |
| 6,978,300 B1 | 12/2005 | Beukema et al. | |
| 6,981,025 B1 | 12/2005 | Frazier et al. | |
| 6,985,956 B2 * | 1/2006 | Luke et al. | 709/229 |
| 7,023,811 B2 | 4/2006 | Pinto | |
| 7,069,468 B1 | 6/2006 | Olson | |
| 7,113,995 B1 | 9/2006 | Beukema et al. | |
| 7,185,025 B2 * | 2/2007 | Rosenstock et al. | |
| 7,194,538 B1 | 3/2007 | Rabe | |
| 7,194,540 B2 | 3/2007 | Aggarwal et al. | |
| 7,200,704 B2 | 4/2007 | Njoku et al. | |
| 7,216,163 B2 | 5/2007 | Sinn | |
| 7,221,676 B2 | 5/2007 | Green | |
| 7,231,518 B1 | 6/2007 | Bakke | |
| 7,290,277 B1 | 10/2007 | Chou et al. | |
| 7,302,484 B1 | 11/2007 | Stapp et al. | |
| 7,356,841 B2 | 4/2008 | Wilson et al. | |
| 7,398,394 B1 | 7/2008 | Johnsen et al. | |
| 7,409,432 B1 * | 8/2008 | Recio et al. | 709/209 |
| 7,437,447 B2 | 10/2008 | Brey et al. | |
| 7,493,409 B2 * | 2/2009 | Craddock et al. | 709/238 |
| 7,500,236 B2 | 3/2009 | Janzen | |
| 7,633,955 B1 | 12/2009 | Saraiya et al. | |
| 7,634,608 B2 | 12/2009 | Droux et al. | |
| 7,636,772 B1 | 12/2009 | Kirby et al. | |
| 7,653,668 B1 | 1/2010 | Shelat | |
| 7,685,385 B1 * | 3/2010 | Choudhary et al. | 711/162 |
| 7,724,748 B2 | 5/2010 | Davis | |
| 7,783,788 B1 | 8/2010 | Quinn et al. | |
| 7,843,822 B1 | 11/2010 | Paul et al. | |
| 7,853,565 B1 * | 12/2010 | Liskov | G06F 11/2097 705/53 |
| 7,860,961 B1 | 12/2010 | Finkelstein et al. | |
| 7,873,711 B2 | 1/2011 | Adams et al. | |
| 7,953,890 B1 | 5/2011 | Katkar | |
| 8,184,555 B1 | 5/2012 | Mouton et al. | |
| 8,291,148 B1 | 10/2012 | Shah et al. | |
| 8,327,437 B2 | 12/2012 | McAlister | |
| 8,331,381 B2 | 12/2012 | Brown et al. | |
| 8,335,915 B2 | 12/2012 | Plotkin et al. | |
| 8,423,780 B2 | 4/2013 | Plotkin et al. | |
| 8,549,281 B2 | 10/2013 | Samovskiy et al. | |
| 8,583,921 B1 | 11/2013 | Shu | |
| 8,627,137 B1 | 1/2014 | Vaidya | |
| 8,635,318 B1 * | 1/2014 | Shankar | H04L 41/085 709/205 |
| 8,769,152 B2 | 7/2014 | Gentieu | |
| 8,935,206 B2 | 1/2015 | Aguilera | |
| 8,935,333 B2 | 1/2015 | Beukema | |
| 2002/0049803 A1 | 4/2002 | Bandhole | |
| 2002/0059597 A1 | 5/2002 | Kikinis et al. | |
| 2002/0120720 A1 * | 8/2002 | Moir | 709/220 |
| 2002/0143914 A1 | 10/2002 | Cihula | |
| 2002/0188711 A1 * | 12/2002 | Meyer et al. | 709/223 |
| 2002/0198755 A1 * | 12/2002 | Birkner | G06F 17/30439 717/104 |
| 2003/0009487 A1 * | 1/2003 | Prabakaran et al. | 707/204 |
| 2003/0009551 A1 | 1/2003 | Benfield et al. | |
| 2003/0033427 A1 | 2/2003 | Brahmaroutu | |
| 2003/0079040 A1 | 4/2003 | Jain et al. | |
| 2003/0093509 A1 * | 5/2003 | Li et al. | 709/223 |
| 2003/0105903 A1 | 6/2003 | Garnett et al. | |
| 2003/0115276 A1 * | 6/2003 | Flaherty | G06F 17/30368 709/206 |
| 2003/0120852 A1 | 6/2003 | McConnell et al. | |
| 2003/0208572 A1 | 11/2003 | Shah et al. | |
| 2004/0022245 A1 | 2/2004 | Forbes et al. | |
| 2004/0068501 A1 * | 4/2004 | McGoveran | G06F 11/1474 |
| 2004/0090925 A1 | 5/2004 | Schoeberl | |
| 2004/0139083 A1 * | 7/2004 | Hahn | G06F 17/30575 |
| 2004/0153849 A1 | 8/2004 | Tucker et al. | |
| 2004/0199764 A1 | 10/2004 | Koechling et al. | |
| 2004/0220947 A1 | 11/2004 | Aman et al. | |
| 2004/0249928 A1 | 12/2004 | Jacobs et al. | |
| 2005/0025520 A1 * | 2/2005 | Murakami | G03G 21/08 399/111 |
| 2005/0044363 A1 | 2/2005 | Zimmer et al. | |
| 2005/0071382 A1 * | 3/2005 | Rosenstock | H04L 67/1095 |
| 2005/0071709 A1 | 3/2005 | Rosenstock et al. | |
| 2005/0086342 A1 | 4/2005 | Burt et al. | |
| 2005/0091396 A1 | 4/2005 | Nilakantan et al. | |
| 2005/0105554 A1 | 5/2005 | Kagan et al. | |
| 2005/0182831 A1 | 8/2005 | Uchida et al. | |
| 2005/0182853 A1 | 8/2005 | Lewites et al. | |
| 2005/0198164 A1 | 9/2005 | Moore et al. | |
| 2005/0198250 A1 | 9/2005 | Wang | |
| 2005/0213608 A1 | 9/2005 | Modi | |
| 2005/0273641 A1 | 12/2005 | Sandven et al. | |
| 2006/0079278 A1 | 4/2006 | Ferguson et al. | |
| 2006/0112297 A1 * | 5/2006 | Davidson | G06F 11/1438 714/2 |
| 2006/0114863 A1 | 6/2006 | Sanzgiri | |
| 2006/0168192 A1 | 7/2006 | Sharma | |
| 2006/0177103 A1 * | 8/2006 | Hildreth | G06F 1/1626 382/107 |
| 2006/0195560 A1 | 8/2006 | Newport | |
| 2006/0221975 A1 | 10/2006 | Lo et al. | |
| 2006/0233168 A1 | 10/2006 | Lewites et al. | |
| 2007/0110245 A1 | 5/2007 | Sood et al. | |
| 2007/0129917 A1 | 6/2007 | Blevins | |
| 2007/0195774 A1 | 8/2007 | Sherman | |
| 2007/0195794 A1 | 8/2007 | Fujita et al. | |
| 2007/0206735 A1 | 9/2007 | Silver et al. | |
| 2007/0253328 A1 * | 11/2007 | Harper et al. | 370/219 |
| 2008/0031266 A1 | 2/2008 | Tallet et al. | |
| 2008/0144614 A1 | 6/2008 | Fisher et al. | |
| 2008/0159277 A1 | 7/2008 | Vobbilisetty et al. | |
| 2008/0183853 A1 | 7/2008 | Manion et al. | |
| 2008/0184332 A1 | 7/2008 | Gerkis | |
| 2008/0192750 A1 | 8/2008 | Ko et al. | |
| 2008/0201486 A1 | 8/2008 | Hsu et al. | |
| 2008/0209018 A1 | 8/2008 | Hernandez et al. | |

(56) References Cited

U.S. PATENT DOCUMENTS

| | | | |
|---|---|---|---|
| 2008/0229096 A1 | 9/2008 | Alroy et al. | |
| 2008/0250125 A1 | 10/2008 | Brey et al. | |
| 2008/0288646 A1* | 11/2008 | Hasha | H04L 67/1095 709/228 |
| 2008/0310421 A1 | 12/2008 | Teisberg | |
| 2008/0310422 A1 | 12/2008 | Booth et al. | |
| 2009/0016356 A1 | 1/2009 | He | |
| 2009/0049164 A1 | 2/2009 | Mizuno | |
| 2009/0106771 A1 | 4/2009 | Benner | |
| 2009/0116404 A1 | 5/2009 | Mahop et al. | |
| 2009/0216853 A1 | 8/2009 | Burrow et al. | |
| 2009/0249472 A1 | 10/2009 | Litvin et al. | |
| 2009/0271472 A1 | 10/2009 | Scheifler | |
| 2009/0307499 A1 | 12/2009 | Senda | |
| 2009/0327462 A1 | 12/2009 | Adams et al. | |
| 2010/0014526 A1 | 1/2010 | Chavan | |
| 2010/0020806 A1 | 1/2010 | Vahdat et al. | |
| 2010/0080117 A1 | 4/2010 | Coronado et al. | |
| 2010/0082853 A1 | 4/2010 | Block et al. | |
| 2010/0114826 A1* | 5/2010 | Voutilainen | G06F 11/1425 707/638 |
| 2010/0138532 A1 | 6/2010 | Glaeser et al. | |
| 2010/0142544 A1* | 6/2010 | Chapel et al. | 370/401 |
| 2010/0166167 A1 | 7/2010 | Karimi-Cherkandi et al. | |
| 2010/0235488 A1* | 9/2010 | Sharma | G06F 11/2028 709/223 |
| 2010/0268857 A1 | 10/2010 | Bauman et al. | |
| 2010/0306772 A1* | 12/2010 | Arnold et al. | 718/1 |
| 2011/0022574 A1 | 1/2011 | Hansen | |
| 2011/0072206 A1 | 3/2011 | Ross et al. | |
| 2011/0110366 A1 | 5/2011 | Moore et al. | |
| 2011/0138185 A1 | 6/2011 | Ju et al. | |
| 2011/0173302 A1 | 7/2011 | Rider | |
| 2011/0209202 A1 | 8/2011 | Otranen | |
| 2011/0222492 A1 | 9/2011 | Borsella et al. | |
| 2011/0264577 A1 | 10/2011 | Winbom et al. | |
| 2011/0283017 A1 | 11/2011 | Alkhatib | |
| 2011/0307886 A1 | 12/2011 | Thanga | |
| 2012/0005480 A1 | 1/2012 | Batke et al. | |
| 2012/0039331 A1 | 2/2012 | Astigarraga et al. | |
| 2012/0195417 A1 | 8/2012 | Hua et al. | |
| 2012/0239928 A1 | 9/2012 | Judell | |
| 2012/0290698 A1 | 11/2012 | Alroy et al. | |
| 2013/0041969 A1 | 2/2013 | Falco et al. | |
| 2013/0138836 A1 | 5/2013 | Cohen et al. | |
| 2013/0159865 A1 | 6/2013 | Smith et al. | |
| 2014/0095876 A1 | 4/2014 | Smith et al. | |

FOREIGN PATENT DOCUMENTS

| | | |
|---|---|---|
| EP | 2 051 436 A1 | 4/2009 |
| JP | 2002 247089 | 8/2002 |
| JP | 2004166263 | 6/2004 |
| JP | 2006157285 | 6/2006 |
| JP | 2007501563 | 1/2007 |
| JP | 2008 054214 | 3/2008 |
| JP | 2009510953 | 3/2009 |
| WO | 01/90838 A2 | 11/2001 |
| WO | 2008099479 | 8/2008 |

OTHER PUBLICATIONS

Lee, M., Security Enhancement in Infiniband Architecture, Apr. 2005, IEEE, vol. 19, pp. 1-18.

Aurelio Bermudez, On the InfiniBand Subnet Discovery Process, IEEE the Computer Society 2003, pp. 1-6.

Tom Shanley, Infiniband Network Architecture, Pearson Education 2002, p. 559, 561.

Tom Shanley, Infiniband Network Architecture (excerpt), chapter—Detailed Description of the Link Layer, Pearson Education, published 2002, p. 390-392, 485, 491-493, 537-539.

Shanley, Tom, "Infiniband Network Architecture", Pearson Education, Copyright © 2002 by MindShare, Inc., published Oct. 2002, p. 387-394.

Shanley, Tom, Infiniband Network Architecture (excerpt), Pearson Education, published 2002, p. 209-211, 393-394, 551, 554.

State Intellectual Property Office of the People's Republic of China, Search Report dated May 29, 2015 for Chinese Patent Application No. 201180040064.9, 1 page.

Search Report from the State Intellectual Property Office of the People's Republic of China dated Jun. 3, 2015 for Chinese Patent Application No. 201180039807.0, 2 pages.

Search Report from the State Intellectual Property Office of the People's Republic of China dated Sep. 9, 2015 for Chinese Patent Application No. 201280027279.1, 2 pages.

Shanley, Tom, "Infiniband Network Architecture", Pearson Education, Copyright © 2002 by MindShare, Inc., published Oct. 2002, p. 204-209, 560-564.

Shanley, Tom, "Infiniband Network Architecture", Pearson Education, Copyright © 2002 by MindShare, Inc., published Oct. 2002, p. 83-87, 95-102, 205-208, 403-406.

Shanley, Tom, "Infiniband Network Architecture", Pearson Education, Copyright © 2002 by MindShare, Inc., published Oct. 2002, p. 206-208, 403-406.

Kashyap, V., "IP over InfiniBand (IpoIB) Architecture", Network Working Group, Request for Comments: 4392, Apr. 2006, 22 pages.

Tom Shanley, Infiniband Network Architecture (excerpt), Pearson Education, Published 2002, p. 213.

State Intellectual Property Office of the People's Republic of China dated May 5, 2015 for Chinese Patent Application No. 201180039850.7, 2 pages.

United States Patent and Trademark Office, Office Action dated Apr. 8, 2016 for U.S. Appl. No. 13/235,161, 24 Pages.

United States Patent and Trademark Office, Office Action dated May 6, 2016 for U.S. Appl. No. 13/488,192, 14 Pages.

Shanley, Tom, "Infiniband Network Architecture" (Excerpt), Copyright 2002 by Mindshare, Inc., p. 86-87.

United States Patent and Trademark Office, Office Action dated Jun. 15, 2017 for U.S. Appl. No. 13/488,113, 22 Pages.

Shanley, Tom "Infiniband Network Architecture" Copyright 2002 by Mindshare, Inc., ISBN: 0-321-11765-4, pp. 117-123 and 629-633.

Shanley, Tom, "Infiniband Network Architecture" (Excerpt), Copyright 2002 by Mindshare, Inc., pp. 8-9, 391-396, 549-551.

United States Patent and Trademark Office, Office Action dated Apr. 18, 2017 for U.S. Appl. No. 13/235,113, 30 Pages.

European Patent Office, International Searching Authority, International Search Report and Written Opinion dated Dec. 15, 2011, International Application No. PCT/US2011/052021, 9 pages.

European Patent Office, International Searching Authority, International Search Report and Written Opinion dated Jan. 11, 2012, International Application No. PCT/US2011/052029, 9 pages.

European Patent Office, International Searching Authority, International Search Report and Written Opinion dated Dec. 15, 2011, International Application No. PCT/US2011/052033, 11 pages.

European Patent Office, International Searching Authority, International Search Report and Written Opinion dated Sep. 12, 2012, International Application No. PCT/US2012/040775, 13 pages.

InfiniBand[SM] Trade Association, InfiniBand™ Architecture Specification, vol. 1, Release 1.2.1, Nov. 2007, pp. 1-1727.

Ching-Min Lin et al., "A New Quorum-Based Scheme for Managing Replicated Data in Distributed Systems" IEEE Transactions on Computers, vol. 51, No. 12, Dec. 2002, 6 Pages.

United States Patent and Trademark Office, Office Action dated Nov. 16, 2017 for U.S. Appl. No. 13/235,113, 28 Pages.

* cited by examiner

PERFORMING PARTIAL SUBNET INITIALIZATION IN A MIDDLEWARE MACHINE ENVIRONMENT

CLAIM OF PRIORITY

This application claims the benefit of priority on U.S. Provisional Patent Application No. 61/384,228, entitled "SYSTEM FOR USE WITH A MIDDLEWARE MACHINE PLATFORM" filed Sep. 17, 2010; U.S. Provisional Patent Application No. 61/484,390, entitled "SYSTEM FOR USE WITH A MIDDLEWARE MACHINE PLATFORM" filed May 10, 2011; U.S. Provisional Patent Application No. 61/493,330, entitled "STATEFUL SUBNET MANAGER FAILOVER IN A MIDDLEWARE MACHINE ENVIRONMENT" filed Jun. 3, 2011; U.S. Provisional Patent Application No. 61/493,347, entitled "PERFORMING PARTIAL SUBNET INITIALIZATION IN A MIDDLEWARE MACHINE ENVIRONMENT" filed Jun. 3, 2011; U.S. Provisional Patent Application No. 61/498,329, entitled "SYSTEM AND METHOD FOR SUPPORTING A MIDDLEWARE MACHINE ENVIRONMENT" filed Jun. 17, 2011, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a middleware machine environment.

BACKGROUND

Infiniband (IB) Architecture is a communications and management infrastructure that supports both I/O and inter-processor communications for one or more computer systems. An IB Architecture system can scale from a small server with a few processors and a few I/O devices to a massively parallel installation with hundreds of processors and thousands of I/O devices.

The IB Architecture defines a switched communications fabric allowing many devices to concurrently communicate with high bandwidth and low latency in a protected, remotely managed environment. An end node can communicate with over multiple IB Architecture ports and can utilize multiple paths through the IB Architecture fabric. A multiplicity of IB Architecture ports and paths through the network are provided for both fault tolerance and increased data transfer bandwidth.

These are the generally areas that embodiments of the invention are intended to address.

SUMMARY

Described herein is a system and method for performing subnet initialization in a middleware machine environment. In accordance with one embodiment, a plurality of management nodes in the middleware machine environment can be interconnected so that a plurality of subnet managers that are associated with the plurality of management nodes can communicate with each other using an in-band communication protocol. The plurality of subnet managers can negotiate and elect a master subnet manager, which operates to configure and manage the middleware machine environment. The master subnet manager can replicate one or more subnet initialization policies to other subnet managers in the middleware machine environment using the in-band communication protocol. The master subnet manager then sets up a plurality of client nodes in the middleware machine environment based on the one or more subnet initialization policies.

DETAILED DESCRIPTION

Described herein is a system and method for providing a middleware machine or similar platform. In accordance with an embodiment of the invention, the system comprises a combination of high performance hardware (e.g. 64-bit processor technology, high performance large memory, and redundant InfiniBand and Ethernet networking) together with an application server or middleware environment, such as WebLogic Suite, to provide a complete Java EE application server complex which includes a massively parallel in-memory grid, that can be provisioned quickly, and that can scale on demand. In accordance with an embodiment of the invention, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment of the invention, the system can include a plurality of compute nodes, one or more IB switch gateways, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

Figure 1:
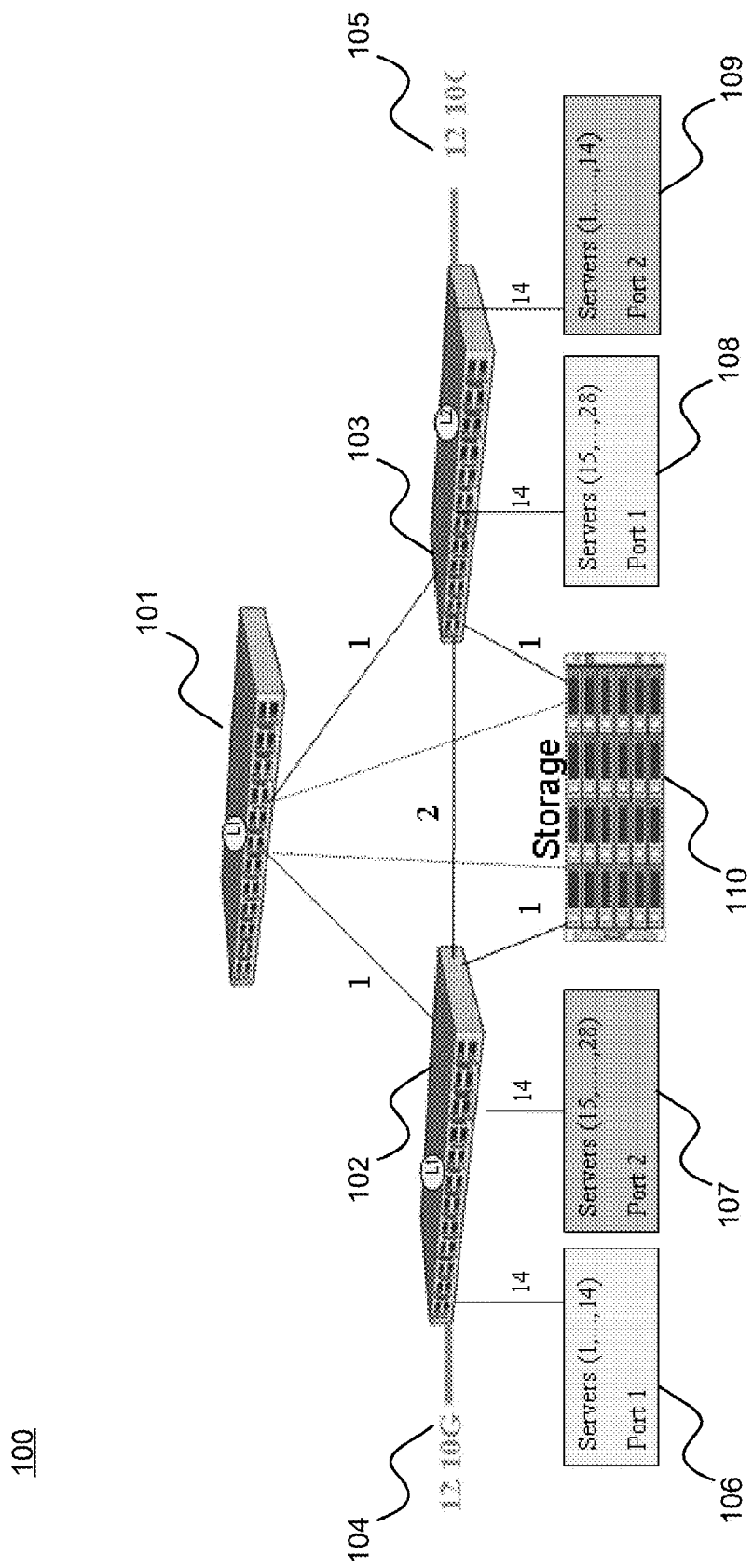
FIG. 1 shows an illustration of an exemplary configuration for a middleware machine, in accordance with an embodiment of the invention.

FIG. 1 shows an illustration of an exemplary configuration for a middleware machine, in accordance with an embodiment of the invention. As shown in FIG. 1, the middleware machine 100 uses a single rack configuration that includes two gateway network switches, or leaf network switches, 102 and 103 that connect to twenty-eight server nodes. Additionally, there can be different configurations for the middleware machine. For example, there can be a half rack configuration that contains a portion of the server nodes, and there can also be a multi-rack configuration that contains a large number of servers.

As shown in FIG. 1, the server nodes 106-109 can connect to the ports provided by the gateway network switches 102-103. Furthermore, each server machine can have connections to the two gateway network switches 102 and 103 separately. For example, the gateway network switch 102 connects to the port 1 of the servers 1-14 106 (14 connections) and the port 2 of the servers 15-28 107 (14 connections), and the gateway network switch 103 connects to the port 1 of the servers 15-28 108 (14 connections) and the port 2 of the servers 1-14 109 (14 connections).

In accordance with an embodiment of the invention, each gateway network switch can have multiple internal ports that are used to connect with different servers, and the gateway network switch can also have external ports that are used to connect with an external network, such as an existing data center service network 104-105 (12 10G connections).

In accordance with an embodiment of the invention, the middleware machine can include a separate storage system 110 that connects to the servers through the gateway network switches 102-103 using single (1) link. Additionally, the middleware machine can include a spine network switch 101 that connects to the two gateway network switches 102 and 103 using single (1) link. As shown in FIG. 1, there can be optionally two (2) links from the storage system to the spine network switch.

IB Fabric/Subnet

In accordance with an embodiment of the invention, an IB Fabric/Subnet in a middleware machine environment can contain a large number of physical hosts or servers, switch instances and gateway instances that are interconnected in a fat-tree topology.

Figure 2:
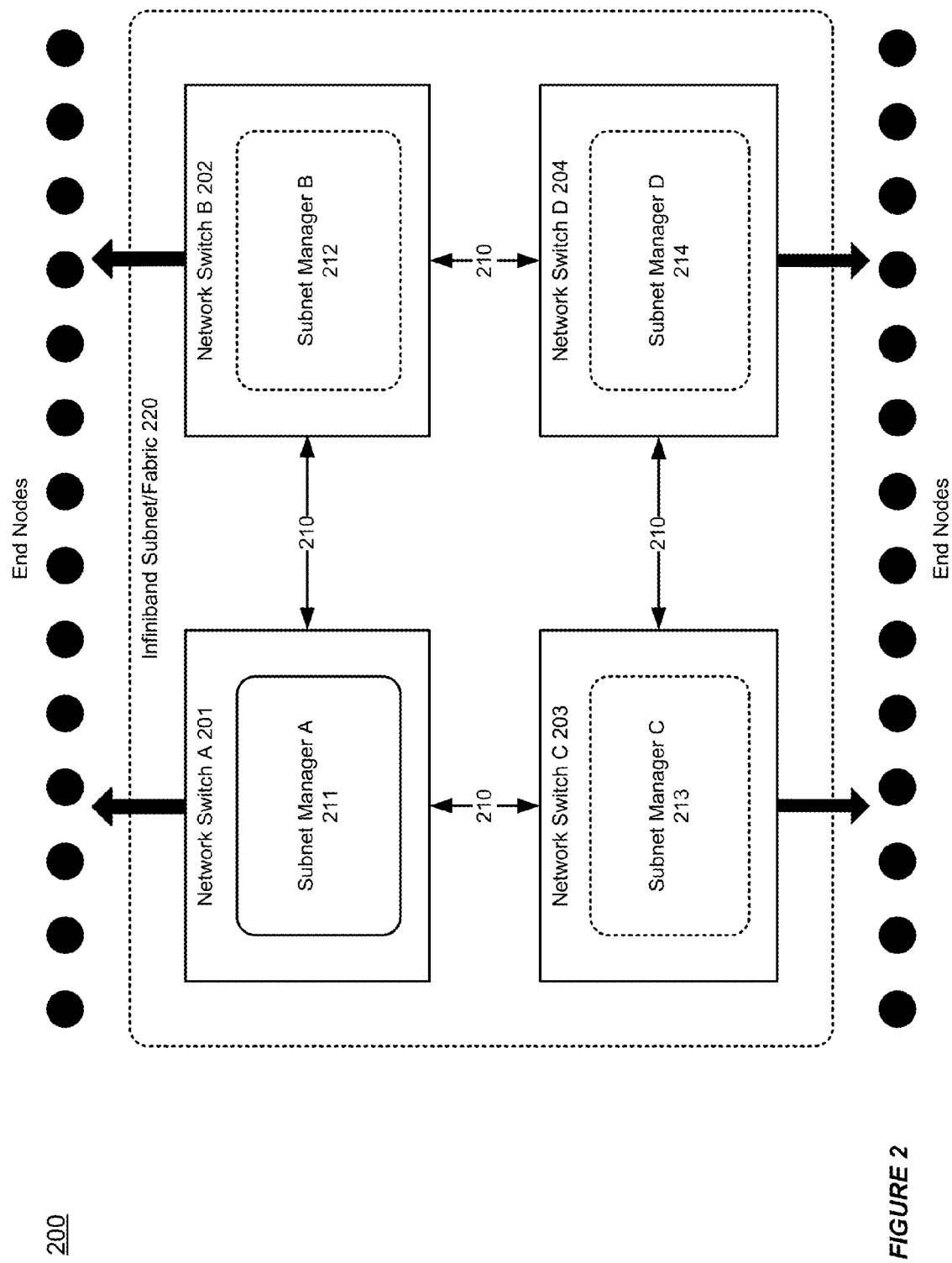
FIG. 2 shows an illustration of a middleware machine environment, in accordance with an embodiment of the invention.

FIG. 2 shows an illustration of a middleware machine environment, in accordance with an embodiment of the invention. As shown in FIG. 2, the middleware machine environment 200 includes an IB subnet or fabric 220 that connects with a plurality of end nodes. The IB subnet includes a plurality of subnet managers 211-214, each of which resides on one of a plurality of network switches 201-204. The subnet managers can communicate with each other using an in-band communication protocol 210, such as the Management Datagram (MAD)/Subnet Management Packet (SMP) based protocols or other protocol such as the Internet Protocol over IB (IPoIB).

In accordance with an embodiment of the invention, a single IP subnet can be constructed on the IB fabric allowing the switches to communicate securely among each other in the same IB fabric (i.e. full connectivity among all switches). The fabric based IP subnet can provide connectivity between any pair of switches when at least one route with operational links exists between the two switches. Recovery from link failures can be achieved if an alternative route exists by re-routing.

The management Ethernet interfaces of the switches can be connected to a single network providing IP level connectivity between all the switches. Each switch can be identified by two main IP addresses: one for the external management Ethernet and one for the fabric based IP subnet. Each switch can monitor connectivity to all other switches using both IP addresses, and can use either operational address for communication. Additionally, each switch can have a point-to-point IP link to each directly connected switch on the fabric. Hence, there can be at least one additional IP address.

IP routing setups allow a network switch to route traffic to another switch via an intermediate switch using a combination of the fabric IP subnet, the external management Ethernet network, and one or more fabric level point-to-point IP links between pairs of switches. IP routing allows external management access to a network switch to be routed via an external Ethernet port on the network switch, as well as through a dedicated routing service on the fabric.

The IB fabric includes multiple network switches with managment Ethernet access to a managment network. There is in-band physical connectivity between the switches in the fabric. In one example, there is at least one in-band route of one or more hops between each pair of switches, when the IB fabric is not degraded. Management nodes for the IB fabric include network switches and management hosts that are connected to the IB fabric.

A subnet manager can be accessed via any of its private IP addresses. The subnet manager can also be accessible via a floating IP address that is configured for the master subnet manager when the subnet manager takes on the role as a master subnet manager, and the subnet manager is unconfigured when it is explicitly released from the role. A master IP address can be defined for both the external management network as well as for the fabric based management IP network. No special master IP address needs to be defined for point-to-point IP links.

In accordance with an embodiment of the invention, each physical host can be virtualized using virtual machine based guests. There can be multiple guests existing concurrently per physical host, for example one guest per CPU core. Additionally, each physical host can have at least one dual-ported Host Channel Adapter (HCA), which can be virtualized and shared among guests, so that the fabric view of a virtualized HCA is a single dual-ported HCA just like a non-virtualized/shared HCA.

The IB fabric can be divided into a dynamic set of resource domains implemented by IB partitions. Each physical host and each gateway instance in an IB fabric can be a member of multiple partitions. Also, multiple guests on the same or different physical hosts can be members of the same or different partitions. The number of the IB partitions for an IB fabric may be limited by the P_Key table size.

In accordance with an embodiment of the invention, a guest may open a set of virtual network interface cards (vNICs) on two or more gateway instances that are accessed directly from a vNIC driver in the guest. The guest can migrate between physical hosts while either retaining or having updated vNIC associates.

In accordance with an embodiment of the invention, switchs can start up in any order and can dynamically select a master subnet manager according to different negotiation protocols, for example an IB specified negotiation protocol.

If no partitioning policy is specified, a default partitioning enabled policy can be used. Additionally, the management node partition and the fabric based management IP subnet can be established independently of any additional policy infomation and independently of whether the complete fabric policy is known by the master subnet manager. In order to allow fabric level configuration policy information to be synchronized using the fabric based IP subnet, the subnet manager can start up initially using the default partition policy. When fabric level synchronization has been achived, the partition configuration, which is current for the fabric, can be installed by the master subnet manager.

Partial Subnet Initialization

In accordance with an embodiment of the invention, subnet initialization can be performed in a middleware machine environment. A plurality of management nodes in the middleware machine environment can be interconnected so that a plurality of subnet managers that are associated with the plurality of management nodes can communicate with each other using an in-band communication protocol. The plurality of subnet managers can negotiate and elect a master subnet manager, which operates to configure and manage the middleware machine environment. The master subnet manager can replicate one or more subnet initialization policies to other subnet managers in the middleware machine environment using the in-band communication protocol. The master subnet manager can then set up a plurality of client nodes in the middleware machine environment based on the one or more subnet initialization policies.

Figure 3:
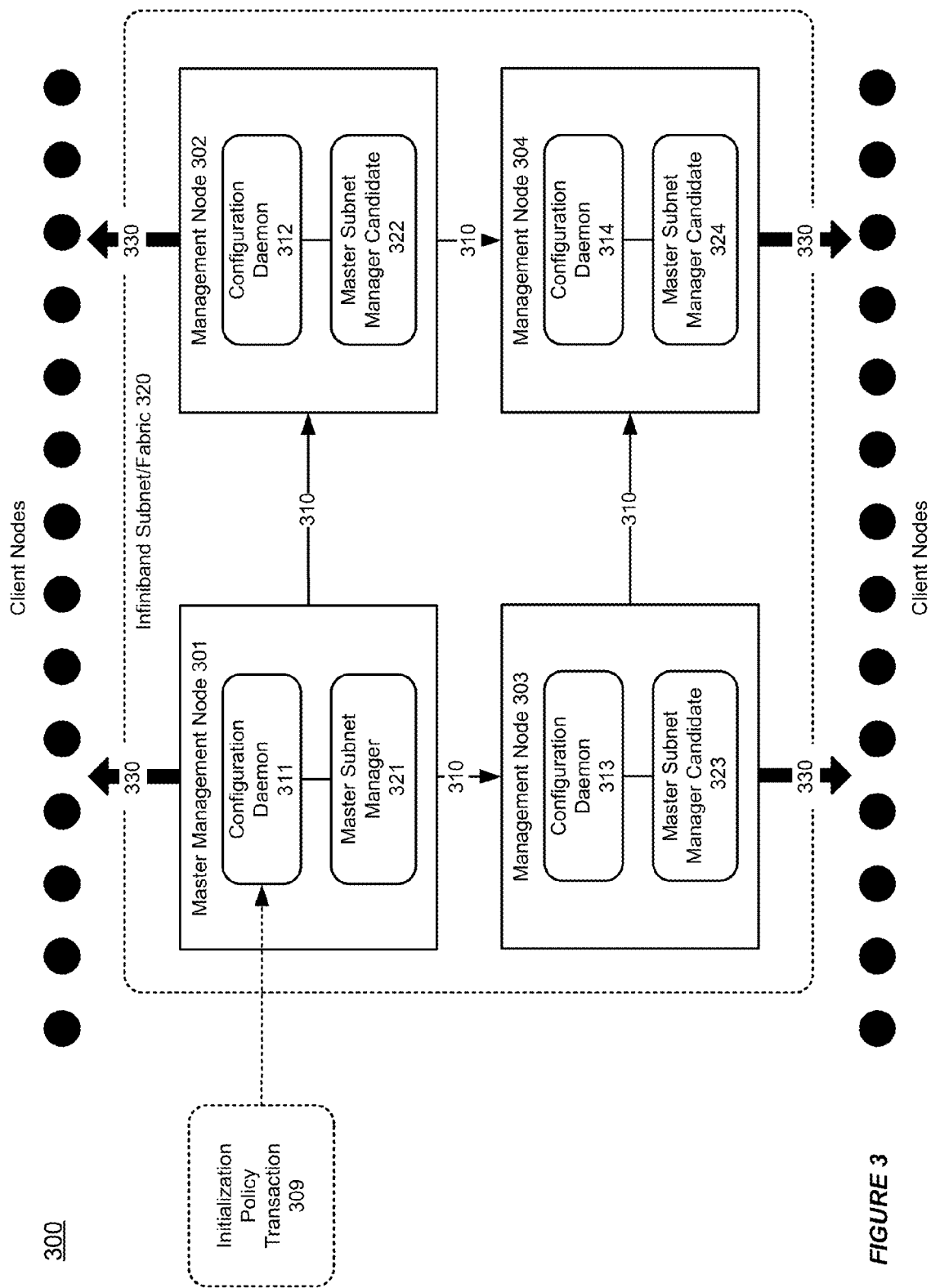
FIG. 3 shows an illustration of a system for performing subnet initialization in a middleware machine environment, in accordance with an embodiment of the invention.

FIG. 3 shows an illustration of a system for performing subnet initialization in a middleware machine environment, in accordance with an embodiment of the invention. As shown in FIG. 3, the middleware machine environment 300 includes an IB subnet or fabric 320 that manages a plurality of client nodes or end nodes. The IB subnet includes a plurality of management nodes 301-304 that maintains a plurality of subnet managers 321-324 associated with a plurality of configuration daemon 311-314. The management nodes can be either a network switch or a predefined host server. The subnet managers can communicate with each other using an in-band communication protocol 310, such as the Internet Protocol over Infiniband (IPoIB).

In accordance with an embodiment of the invention, the system can provide a plurality of policy daemons 311-314, each of which is associated with a subnet manager 321-324. In the example as shown in FIG. 3, the policy daemon 311 that collocates with the master subnet manager 301 is responsible for configuring and managing the end nodes in the middleware machine environment using one or more policies.

One exemplary policy managed by a policy daemon in a middleware machine environment can be a partition configuration policy. For example, a middleware machine environment that includes end nodes, A, B and C can be partitioned into two groups: a Group I that includes nodes A and B and a Group II that includes node C. A partition configuration policy can define a partition update that requires deleting node B from the Group I, before adding node B into the Group II. This partition configuration policy can require that the master subnet manager will not allow a new partition to add node B into Group II without first deleting nodes B from Group I. This partition configuration policy can be enforced by the master subnet manager using a policy daemon.

The in-band communication connectivity provides communication redundancy in addition to the Ethernet networking in the middleware machine environment. The system can take advantage of the communication redundancy provided by the middleware machine environment and use the IB subnet under configuration as the management network for distributing fabric initialization policies in order to fully configure the middleware machine environment.

In accordance with an embodiment of the invention, the subnet managers in the IB subnet can first negotiate with each other and elect a master subnet manager 321, which is responsible for configuring and managing the middleware machine environment. The master subnet manager can replicate one or more fabric initialization policies in the configuration daemon to other subnet manager master candidates 322-324 in the middleware machine environment, using the in-band communication protocol within the context of an initialization policy transaction 309. Then, the master subnet manager can set up the plurality of end nodes in the middleware machine environment based on the one or more subnet initialization policies.

In accordance with an embodiment of the invention, each management node can connect with one or more client nodes or end nodes such as the host servers within the middleware machine environment, using Ethernet network connection 330. The network switch can be either a leaf switch that communicates directly with the end nodes, or a spine switch that communicates with the end nodes through the leaf switches. The network switches can communicate with the host servers via the switch ports of the network switches and host ports of the host servers. In IB network, partitions can be defined to specify which end ports are able to communicate with other end ports. The middleware machine environment can employ a fat-tree topology, which allows for a small number of switches sitting at the top layers of the fat tree while maintaining a large number of end nodes as leafs of the tree.

Figure 4:
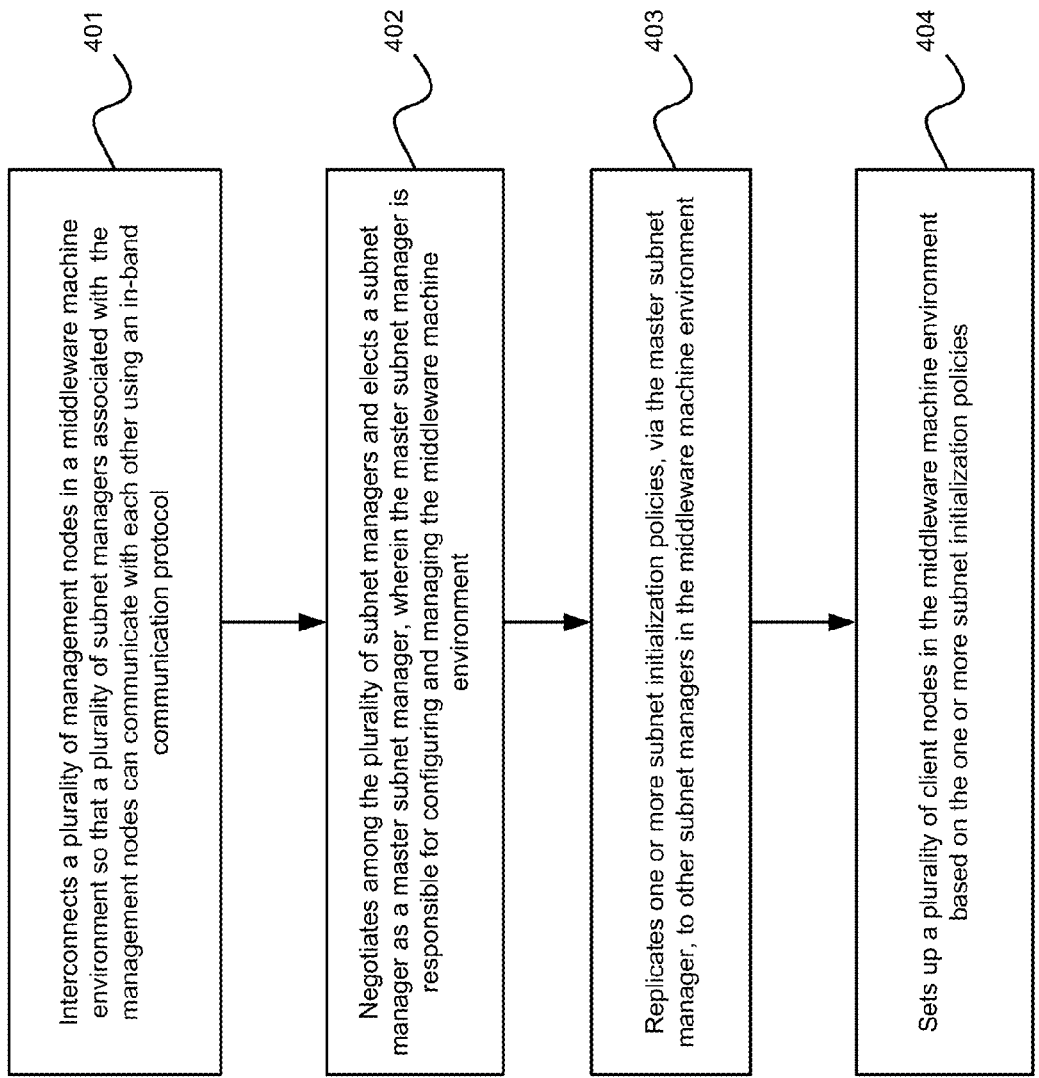
FIG. 4 illustrates an exemplary flow chart for performing subnet initialization in a middleware machine environment in accordance with an embodiment.

FIG. 4 illustrates an exemplary flow chart for performing subnet initialization in a middleware machine environment in accordance with an embodiment. As shown in FIG. 4, at step 401, a plurality of management nodes can be interconnected in the middleware machine environment so that a plurality of subnet managers associated with the management nodes can communicate with each other using an in-band communication protocol. The plurality of subnet managers can first negotiate among each other and elect a master subnet manager, at step 402. The master subnet manager is responsible for configuring and managing the middleware machine environment. Furthermore, at step 403, the master subnet manager can replicate one or more subnet initialization policies to other subnet managers in the middleware machine environment using the in-band communication protocol. Then, at step 404, the master subnet manager can set up a plurality of client nodes in the middleware machine environment based on the one or more subnet initialization policies.

Subnet Initialization with Partition Configuration Policies

Figure 5:
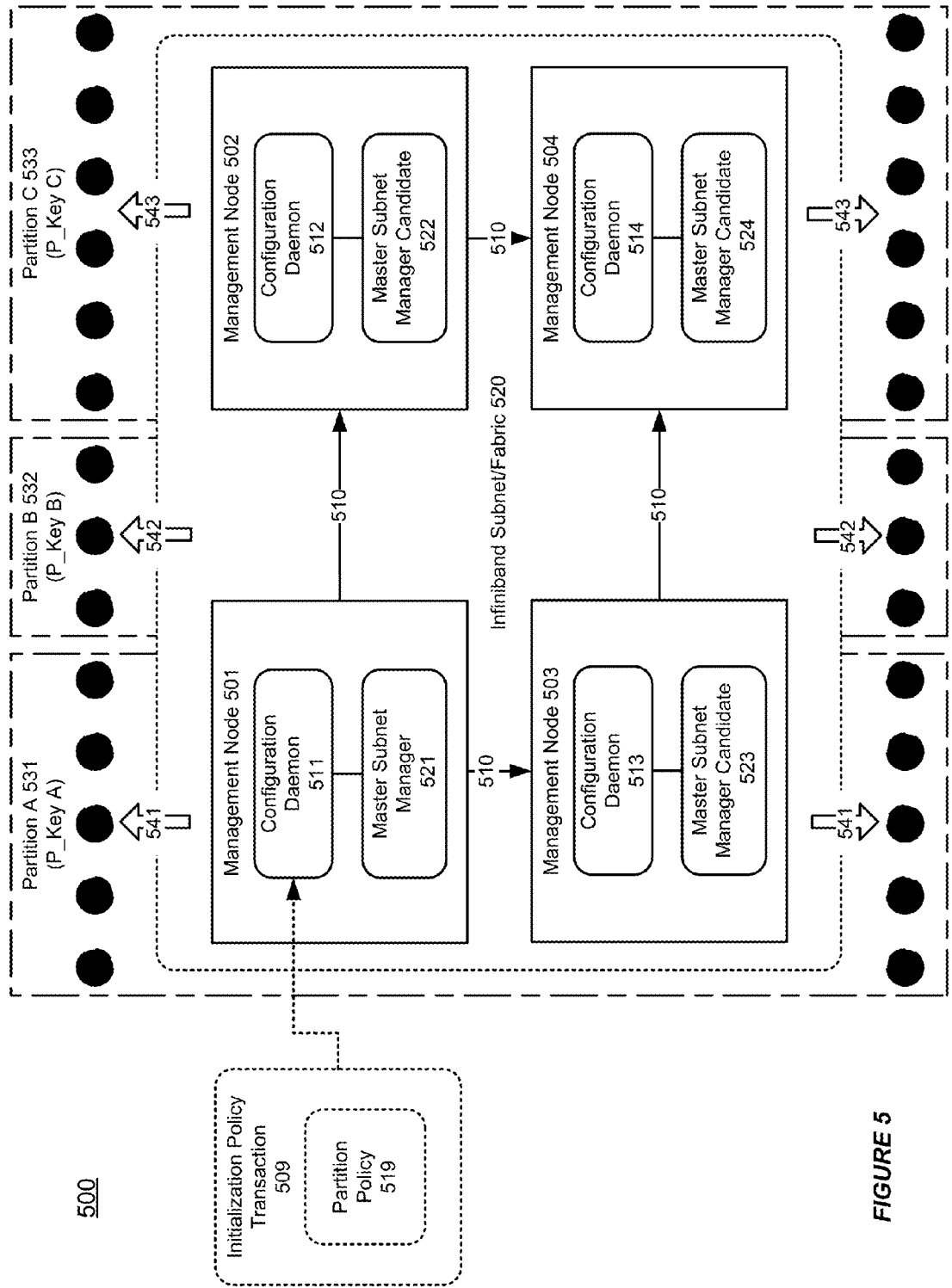
FIG. 5 shows an illustration of a middleware machine environment with different partition groups, in accordance with an embodiment of the invention.

FIG. 5 shows an illustration of a middleware machine environment with different partition groups, in accordance with an embodiment of the invention. As shown in FIG. 5, the middleware machine environment 500 includes an IB subnet or fabric 520 that manages a plurality of client nodes or end nodes. The IB subnet 520 includes a plurality of management nodes 501-504 that maintains a plurality of subnet managers 521-524 associated with a plurality of configuration daemon 511-514. The subnet managers 521-524 can communicate with each other using an in-band communication protocol 510. One or more partition policies 519 can define a partition configuration in a middleware machine environment 500. The one or more partition policies can be supplied to the middleware machine environment through an initialization policy transaction 509. As a result of the partition configuration, the middleware machine environment 500 can be divided into three separate partition groups: Partition A 531, Partition B 532, and Partition C 533. Each partition group can be associated with a unique partition key and can be logically connect to the IB subnet 520 using a separate connection 541-543.

In accordance with an embodiment of the invention, the subnet managers located at the network switches in an IB network can communicate with the host servers via the switch ports of the network switches and host ports of the host servers. Partitions can be defined to specify which end ports are able to communicate with each other. An IB partition can be defined by a P_Key which is a sixteen bit numerical value, where the lower fifteen bits define the partition number, and the top bit defines whether the associated port is a full or limited member in that partition. A limited member can only communicate with a full member, whereas full members can communicate among themselves as well as with any limited member of the same partition.

Each end port can be a member of at least one partition in order to be able to communicate with any other end-port (i.e. use of the P_Key field is not optional in the IB transport protocol). For switch ports, partition enforcement is an optional feature controlled by the Subnet Manager.

The subnet manager controls partition membership by updating the partition tables of the relevant end ports and switch ports. If the trust model for the fabric or a particular host implies that the host or host administrator may not be fully adhering to the partitioning that the subnet manager has defined, then switch-based enforcement can be used so that the switch ingress/egress port can enforce the same restrictions as the subnet manager has set up for the corresponding host port.

The number of partitions that a port can represent is a hardware implementation parameter reflected as port attributes to the subnet manager (For example, in the 16-64/128 range). Hence, while it is possible to have up to 32K individual P_Key values defined for the fabric, each port can be a member of a limited subset, and the switch enforcement of partitioning is enabled for switch fabric ingress/egress ports that are directly connecting to end-ports.

The default partition key (0xFFFF—full, or 0x7FFF—limited) can be reserved by the specification and is used (by default) for access to the Subnet Manager. In a system that uses partition enforcement, end nodes are limited members of the default partition in order to be able to communicate with the subnet manager. If partition enforcement is not used, then end-nodes are full members of the default partition. The value zero can be reserved and used to represent an invalid P_Key value.

In order to synchronize fabric level configuration policy information among the fabric based subnet, the master subnet manager can start up initially using the default partition policy. When fabric level synchronization has been achieved, the master subnet manager can proceed to install the partition configuration in the middleware machine environment.

In accordance with an embodiment of the invention, using the default configuration with end nodes only being limited members of the default partition allows no illegal communication between end-nodes before the correct current partitioning policy can be implemented. The master subnet manager can set up the management nodes to be full members of a predefined partition and thereby allow the policy daemons to communicate using IPoIB, so that replication/synchronization of the current dynamic partition policy can take place via the IB fabric. However, such a scheme forcing end nodes to become only limited members of the default partition has the disadvantage of interrupting existing communication, when the fabric is already operational with on-going communication between end nodes at the time the current master subnet manager takes over the subnet.

In accordance with an embodiment of the invention, in order to avoid an interruption of on-going legal communication, and to provide IPoIB based communication between all designated management nodes before the policy daemons have been able to synchronize, the new subnet manager can leave current partition membership for already operational nodes unchanged and can ensure that only the predefined partition is set up for the management nodes. Non-management nodes that are currently not operational may not be initialized (i.e. requires initialization from the master subnet manager). Or, alternatively, the non-management nodes may only be set up with limited membership in the default partition. Then, when the current partition policy has been fully synchronized, all end-nodes can be fully initialized with the complete partition membership defined by the current partitioning policy.

The above scheme can be useful since any current master subnet manager can initialize the IB fabric to be in compliance with the current partition policy, and the failure of a master subnet manager can leave the fabric in a state where it is either fully initialized or is in a state where the current policy have been partially implemented. This includes the case where an old master fails before it has completed removing membership defined by an old policy but not present in a new policy.

In accordance with an embodiment of the invention, the replication and synchronization between the policy daemons can ensure that a quorum or majority of the subnet manager master candidates are updated with the new policy before any change is committed. Then, the actual removing of old partition membership and addition of new membership can be completely implemented by a single current master subnet manager, or be implemented in two or more partial steps by two or more master subnet manager instances as the result of fail-over or hand-over of mastership in the subnet. Each such partial step may or may not change any state in the IB subnet but can be guaranteed to not introduce any intermediate states that are not either a subset of the membership defined by the old policy or a subset of the new policy without any chance of mixing any policy from the two versions. Also, in the case of one or more fail-over or hand-over events, the new master subnet manager may not undo the operations performed by the former master but can start from the relevant next step based on the current policy and the current state of the IB subnet that the new master discovers dynamically.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for performing subnet initialization in a middleware machine environment, the system comprising:
   a plurality of network switches, wherein each network switch comprises a microprocessor executing a management node, wherein each management node comprises one policy daemon and one subnet manager; and
   a plurality of client nodes interconnected by said plurality of network switches in a subnet,
   wherein the plurality of subnet managers are in communication with each other using an in-band communication protocol in the subnet, wherein a first subnet manager of the plurality of subnet managers is an initial master subnet manager,
   wherein the plurality of network switches have a first partition policy specifying a first partition membership of the client nodes in the middleware machine environment,
   wherein the plurality of subnet managers negotiate with each other to elect an elected master subnet manager,
   wherein a fail-over or hand-over of mastership occurs resulting in two or more master subnet manager instances, one master subnet manager instance of the two or more master subnet manager instances being the initial master subnet manager and another master subnet manager instance of the two or more master subnet manager instances being the elected master subnet manager,
   wherein the elected master subnet manager uses the in-band communication protocol within a context of an initialization policy transaction to receive a new subnet initialization policy, wherein the new subnet initialization policy comprises a second partition policy different than the first partition policy, and wherein the second partition policy specifies a second partition membership of the client nodes in the middleware machine environment different than the first partition membership,
   wherein the first partition membership of the client nodes in the middleware machine environment remains unchanged until the second partition policy is fully synchronized to the plurality of policy daemons,
   wherein the elected master subnet manager replicates the new subnet initialization policy for the other subnet managers in the middleware machine environment as a replicated new subnet initialization policy,
   wherein the elected master subnet manager, using the in-band communication protocol, distributes the replicated new subnet initialization policy to its respective management nodes for use by the subnet managers of each respective management node,
   wherein the plurality of policy daemons obtain the replicated new subnet initialization policy from the respective subnet manager of its respective management node,
   wherein the elected master subnet manager introduces one or more partition policy intermediate states to commit the change of the first partition membership of the client nodes in the middleware machine specified by the first partition policy to the second partition membership of the client nodes in the middleware machine specified by the second partition policy, wherein the one or more partition policy intermediate states are only either a subset of the first partition policy specifying the first partition membership of the client nodes in the middleware machine or a subset of the second partition policy specifying the second partition membership of the client nodes in the middleware machine,
   wherein the elected master subnet manager commits the change from the first partition membership specified by the first partition policy to the second partition membership specified by the second partition policy in the two or more partial steps by reaching a number of the partition policy intermediate states where a quorum or majority of the plurality of subnet managers are updated with the second partition policy,
   wherein the elected master subnet manager, after the second partition policy is fully synchronized to the plurality of policy daemons, updates the plurality of subnet managers to the second partition policy using the plurality of policy daemons and configures the plurality of client nodes in the middleware machine environment based on the second partition policy and the second partition membership.

2. The system according to claim 1, wherein:
the plurality of client nodes are interconnected by the plurality of network switches in an Infiniband (IB) subnet.

3. The system according to claim 1, further comprising:
a separate storage system that connects with the plurality of management nodes.

4. The system according to claim 1, further comprising:
a plurality of host servers that connect with the plurality of management nodes.

5. The system according to claim 1, further comprising:
one or more gateway instances that are selectively accessed by an associated guest.

6. The system according to claim 1, wherein:
the plurality of policy daemons communicate using Internet Protocol (IP) over InfiniBand (IB); and
synchronization of the second partition policy is performed using an IB fabric.

7. The system according to claim 1, further comprising:
a policy daemon collocated with the elected master subnet manager, wherein the policy daemon collocated with the elected master subnet manager configures the middleware machine environment using one or more policies.

8. The system according to claim 1, wherein:
the middleware machine environment comprises an Ethernet network; and the in-band communication provides communication redundancy in addition to Ethernet networking in the Ethernet network.

9. The system according to claim 1, wherein:
the first and second partition policies define, respectively, first and second partition configurations in the middleware machine environment; and
the first and second partition policies are supplied to the middleware machine environment through an initialization policy transaction.

10. The system according to claim 1, wherein:
the elected master subnet manager uses a default partitioning policy for initialization when the second partitioning policy is not specified by the new subnet initialization policy received by the elected master subnet manager within the context of the initialization policy transaction.

11. The system according to claim 10, wherein:
the elected master subnet manager operates to configure one or more end nodes in the subnet as only limited members of a default partition based on the default partitioning policy.

12. The system according to claim 11, wherein:
the elected master subnet manager operates to prevent illegal communication between said one or more end nodes which are only limited members of the default partition.

13. The system according to claim 1, wherein:
the elected master subnet manager operates to synchronize fabric level configuration policy by starting up initially using a default partition policy, and wherein the elected master subnet manager proceeds to install a partition configuration in the middleware machine environment, when fabric level synchronization has been achieved.

14. The system according to claim 1, wherein:
a replication and synchronization of the one or more partition policies is implemented in the two or more partial steps by the two or more instances of the elected master subnet manager as a result of the fail-over or of the hand-over of mastership.

15. The system according to claim 1, further comprising:
a new master subnet manager different than the elected master subnet manager,
wherein the new master subnet manager dynamically discovers the second partition policy of the subnet and a current state of the subnet having the second partition policy;
wherein the elected master subnet manager performs operations in accordance with the first partition policy of the subnet;
wherein the new master subnet manager performs operations in accordance with the second partition policy and current state of the subnet without undoing the operations performed by the elected master subnet manager in accordance with the first partition policy of the subnet.

16. A method for performing subnet initialization in a middleware machine environment, the method comprising:
executing a management node in each of a plurality of network switches comprising a plurality of microprocessors, wherein each management node comprises one policy daemon and one subnet manager, wherein the plurality of network switches interconnect a plurality of client nodes in a subnet;
communicating between the plurality of subnet managers using an in-band communication protocol in the subnet, wherein a first subnet manager of the plurality of subnet managers is an initial master subnet manager, wherein the plurality of network switches have a first partition policy specifying a first partition membership of the client nodes in the middleware machine environment;
negotiating by the plurality of subnet managers to elect an elected master subnet manager, wherein a fail-over or hand-over of mastership occurs resulting in two or more master subnet manager instances, one master subnet manager instance of the two or more master subnet manager instances being the initial master subnet manager and another master subnet manager instance of the two or more master subnet manager instances being the elected master subnet manager;
using the in-band communication protocol within a context of an initialization policy transaction, receiving by the elected master subnet manager a new subnet initialization policy, wherein the new subnet initialization policy comprises a second partition policy different than the first partition policy, and wherein the second partition policy specifies a second partition membership of the client nodes in the middleware machine environment different than the first partition membership;
permitting the first partition membership of the client nodes in the middleware machine environment to remain unchanged until the second partition policy is fully synchronized to the plurality of policy daemons;
replicating by the elected master subnet manager the new subnet initialization policy for the other subnet managers in the middleware machine environment as a replicated new subnet initialization policy;
using the in-band communication protocol, distributing by the elected master subnet manager, the replicated new subnet initialization policy to its respective management nodes for use by the subnet managers of each respective management node;
obtaining by the plurality of policy daemons the replicated new subnet initialization policy from the respective subnet manager of its respective management node;
introducing by the elected master subnet manager one or more partition policy intermediate states to commit the change of the first partition membership of the client nodes in the middleware machine specified by the first partition policy to the second partition membership of the client nodes in the middleware machine specified by the second partition policy, wherein the one or more partition policy intermediate states are only either a subset of the first partition policy specifying the first partition membership of the client nodes in the middleware machine or a subset of the second partition policy specifying the second partition membership of the client nodes in the middleware machine;
committing by the elected master subnet manager the change from the first partition membership specified by the first partition policy to the second partition membership specified by the second partition policy in the two or more partial steps by reaching a number of the partition policy intermediate states where a quorum or majority of the plurality of subnet managers are updated with the second partition policy; and
after the second partition policy is fully synchronized to the plurality of policy daemons, updating by the elected master subnet manager the plurality of subnet managers to the second partition policy using the plurality of policy daemons and configuring the plurality of client nodes in the middleware machine environment based on the second partition policy and the second partition membership.

17. The method according to claim 16, further comprising:
using by the elected master subnet manager a default partitioning policy for initialization when the second partitioning policy is not specified by the new subnet initialization policy received by the elected master subnet manager within the context of the initialization policy transaction.

18. The method according to claim 17, further comprising:
configuring by the elected master subnet manager one or more end nodes in the subnet as only limited members of a default partition based on the default partitioning policy.

19. The method according to claim 18, further comprising:
preventing by the elected master subnet manager illegal communication between said one or more end nodes which are only limited members of the default partition.

20. The method according to claim 16, further comprising:
selecting a new master subnet manager different than the elected master subnet manager,
dynamically discovering by the new master subnet manager the second partition policy of the subnet and a current state of the subnet having the second partition policy;
performing operations by the elected master subnet manager in accordance with the first partition policy of the subnet; and
performing operations by the new master subnet manager in accordance with the second partition policy and current state of the subnet without undoing the operations performed by the elected master subnet manager in accordance with the first partition policy of the subnet.

21. A non-transitory machine readable medium having instructions stored thereon for supporting subnet initialization in a middleware machine environment, which instructions, when executed in a middleware machine environment cause the middleware machine environment to perform steps comprising:
executing a management node in each of a plurality of network switches comprising a plurality of microprocessors, wherein each management node comprises one policy daemon and one subnet manager, wherein the plurality of network switches interconnect a plurality of client nodes in a subnet;
communicating between the plurality of subnet managers using an in-band communication protocol in the subnet, wherein a first subnet manager of the plurality of subnet managers is an initial master subnet manager, wherein the plurality of network switches have a first partition policy specifying a first partition membership of the client nodes in the middleware machine environment;
negotiating by the plurality of subnet managers to elect an elected master subnet manager, wherein a fail-over or hand-over of mastership occurs resulting in two or more master subnet manager instances, one master subnet manager instance of the two or more master subnet manager instances being the initial master subnet manager and another master subnet manager instance of the two or more master subnet manager instances being the elected master subnet manager;
using the in-band communication protocol within a context of an initialization policy transaction, receiving by the elected master subnet manager a new subnet initialization policy, wherein the new subnet initialization policy comprises a second partition policy different than the first partition policy, and wherein the second partition policy specifies a second partition membership of the client nodes in the middleware machine environment different than the first partition membership;
permitting the first partition membership of the client nodes in the middleware machine environment to remain unchanged until the second partition policy is fully synchronized to the plurality of policy daemons;
replicating by the elected master subnet manager the new subnet initialization policy for the other subnet managers in the middleware machine environment as a replicated new subnet initialization policy;
using the in-band communication protocol, distributing by the elected master subnet manager, the replicated new subnet initialization policy to its respective management nodes for use by the subnet managers of each respective management node;
obtaining by the plurality of policy daemons the replicated new subnet initialization policy from the respective subnet manager of its respective management node;
introducing by the elected master subnet manager one or more partition policy intermediate states to commit the change of the first partition membership of the client nodes in the middleware machine specified by the first partition policy to the second partition membership of the client nodes in the middleware machine specified by the second partition policy, wherein the one or more partition policy intermediate states are only either a subset of the first partition policy specifying the first partition membership of the client nodes in the middleware machine or a subset of the second partition policy specifying the second partition membership of the client nodes in the middleware machine;
committing by the elected master subnet manager the change from the first partition membership specified by the first partition policy to the second partition membership specified by the second partition policy in the two or more partial steps by reaching a number of the partition policy intermediate states where a quorum or majority of the plurality of subnet managers are updated with the second partition policy; and
after the second partition policy is fully synchronized to the plurality of policy daemons, updating by the elected master subnet manager the plurality of subnet managers to the second partition policy using the plurality of policy daemons and configuring the plurality of client nodes in the middleware machine environment based on the second partition policy and the second partition membership.

22. The non-transitory machine readable medium according to claim 21, further comprising:
using by the elected master subnet manager a default partitioning policy for initialization when the second partitioning policy is not specified by the new subnet initialization policy received by the elected master subnet manager within the context of the initialization policy transaction.

23. The non-transitory machine readable medium according to claim 22, further comprising:
  configuring by the elected master subnet manager one or more end nodes in the subnet as only limited members of a default partition based on the default partitioning policy.

24. The non-transitory machine readable medium according to claim 23, further comprising:
  preventing by the elected master subnet manager illegal communication between said one or more end nodes which are only limited members of the default partition.

25. The non-transitory machine readable medium according to claim 21, further comprising:
  selecting a new master subnet manager different than the elected master subnet manager,
  dynamically discovering by the new master subnet manager the second partition policy of the subnet and a current state of the subnet having the second partition policy;
  performing operations by the elected master subnet manager in accordance with the first partition policy of the subnet; and
  performing operations by the new master subnet manager in accordance with the second partition policy and current state of the subnet without undoing the operations performed by the elected master subnet manager in accordance with the first partition policy of the subnet.

* * * * *